J. L. ROLLINS.
WATER METER FOR CONTINUOUS DISCHARGE WITH VARIABLE HEAD.
APPLICATION FILED MAR. 30, 1915.
1,183,122. Patented May 16, 1916.
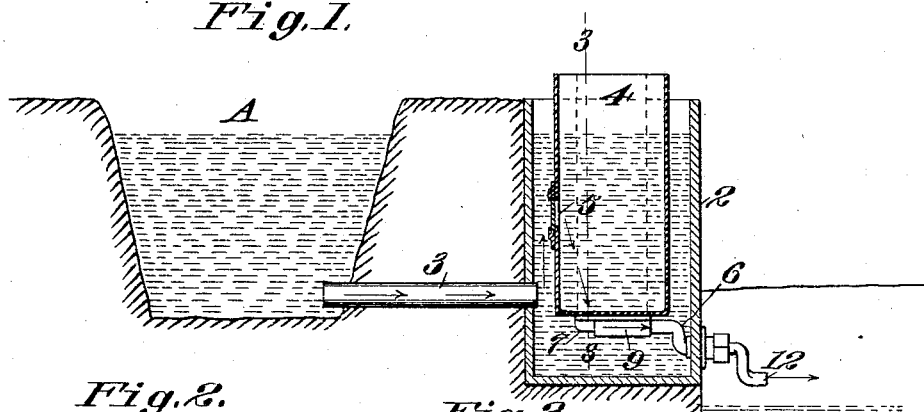
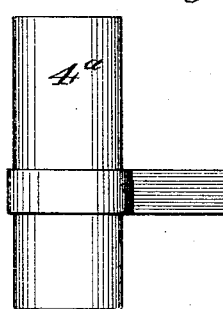
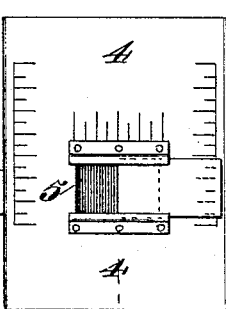
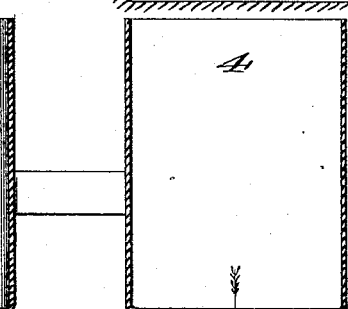
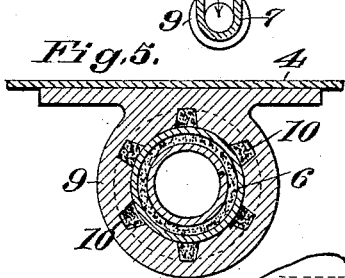
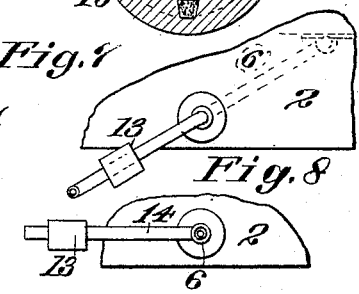
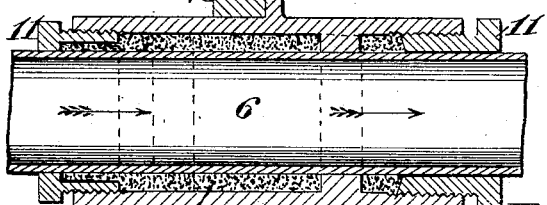
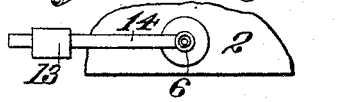
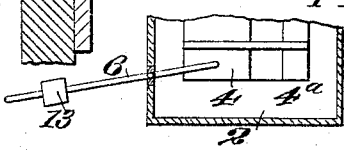
WITNESSES:
Charles Pickles
Frances V. Cole
INVENTOR
Jarrot L. Rollins.
BY G. H. Strong
ATTORNEY

UNITED STATES PATENT OFFICE.

JARROT L. ROLLINS, OF COLFAX, CALIFORNIA.

WATER-METER FOR CONTINUOUS DISCHARGE WITH VARIABLE HEAD.

1,183,122.  Specification of Letters Patent.  Patented May 16, 1916.

Application filed March 30, 1915. Serial No. 18,032.

*To all whom it may concern:*

Be it known that I, JARROT L. ROLLINS, a citizen of the United States, residing at Colfax, in the county of Placer and State of California, have invented new and useful Improvements in Water-Meters for Continuous Discharge with Variable Head, of which the following is a specification.

My invention relates to a means for providing a uniform discharge of water from a source having a variable head, such as a supply of irrigating water taken from a ditch in which the depth of water flowing therein may vary. It consists of a tank or receptacle directly connected with the ditch and in which the water will maintain approximately the same level, a float adapted to rise and fall in the ditch having means for admitting water under the required head or pressure, and a discharge pipe leading from the bottom of the float from which it receives water, through the side of the tank and having a crank form turnable about its journal in the wall of the tank so as to allow the float to rise and fall and maintain a constant level of the water.

It also comprises details of construction which will be more fully explained by reference to the accompanying drawings, in which—

Figure 1 is a transverse section of a ditch showing the connecting pipe, tank, float and discharge pipe. Fig. 2 is an exterior view of the float showing gages for the amount of submersion and for the admission of the desired amount of water. Fig. 3 is a vertical section on line 3—3 of Fig. 1. Fig. 4 is a vertical section on line 4—4 of Fig. 2. Fig. 5 is a vertical transverse section on line 5—5 of Fig. 4. Fig. 6 is a vertical longitudinal section of the pipe bearing in the receiving tank. Fig. 7 shows a fragment of the bottom of the tank with a discharge pipe and counterbalance on the crank end of the pipe. Fig. 8 shows a straight discharge with an independent counterbalancing arm. Fig. 9 shows another form of the discharge.

For the purpose of supplying water for irrigating, mining, and power, it is customary to build ditches in which the water may flow for long distances, and to take the water from these ditches at intervals where it is to be used. Such water is usually measured by a meter and the quantity is indicated by what is known as "miner's inches", that is, the amount of water which will flow through a horizontal passage a certain distance below the level of the water in the ditch and having a width vertically of one inch and a length as long as will discharge the desired amount of water. The error in this method arises from the difference in depth of the water flowing in the ditch and the consequent variation in the depth of the discharge below the surface of the flowing water.

My invention is designed to overcome this objection, and it consists in connecting a ditch A with a tank or receiver 2 by means of a pipe or passage 3, which, in the present case, is shown extending through the bank of the ditch close to which the tank 2 is fixed. This allows the water in the tank to rise to a level with that in the ditch and to vary in depth in unison with the variation of the depth of the flowing water. In order to give a constant depth from the surface of the water to the point at which it is to be discharged, I have shown a hollow float 4 located within the tank and having an opening 5 on the side at a point below the surface to which the water may be admitted to flow through the hollow float 4 to the discharge pipe at the bottom.

In Figs. 2 and 3, I have shown a supplemental float 4ª secured by an arm to one side of the float 4 for the purpose of counterbalancing the float 4 and keeping it substantially level in its rise and fall within the tank 2, and against the turning resistance of the discharge pipe 6 which is connected with the float receiver. This pipe 6 may be journaled horizontally to the bottom of the float with which it is connected by an elbow 7 opening from the bottom of the float and turning at right angles to enter the pipe 6, as shown in Fig. 4. Suitable packing 8 surrounds the horizontal end of the elbow 7 where it enters the pipe 6. The pipe 6 is inclosed in an exterior sleeve 9 within which is a water-tight packing 10 which prevents leakage of water around this pipe. A gland or follower 11 is adapted to screw into the outer end of this sleeve to keep the packing in place and also to force in a certain amount of lubricant which will keep it in proper water-tight condition.

In Fig. 5 I have shown channels arranged radially within the sleeve and around the pipe 6 to allow lubricant to be forced through these channels into the packing 10. The pipe 6 is bent into the form of a crank which extends horizontally or diagonally with relation to the bottom of the float chamber and passes through the side of the tank 2, having its discharge outside of said tank, and to any desired point of delivery, as at 12. The journal in the side of the tank, through which the crank portion passes, is in a similar manner packed and provided with glands to retain the packing and lubricant in place, as shown in Fig. 6. The cranking of this discharge pipe thus allows the float chamber 4 to rise and fall within the tank 2 and thus maintain the water inlet from the tank to the chamber in a constant position with relation to the surface of the water.

Thus if the water falls in the ditch it will fall to a similar extent entering the tank 2 and the float will be allowed to settle so as to maintain the inlet opening 5 at a constant level with relation to the surface of the water, and the amount of water in the float chamber 4 will always provide a constant discharge pressure through the crank pipe. The supplemental float 4ª, when employed, serves to resist any tendency of the float chamber to tilt, and in addition to this a counterweight 13 may be adjustably attached to the outer discharge end of the pipe, as in Fig. 7, or, if the discharge be direct, the counterweight 13 may be attached to a supplemental arm, as at 14, in Fig. 8.

Having thus described my invention, what I claim and desire to secure by Letters Patent is—

1. In a constant level meter, a tank having connection with a variable source of supply, a vertically movable float in the tank having an inlet passage, a cranked discharge pipe, means for turnably connecting one end of the pipe to the bottom of the float and for effecting communication between said pipe end and the float interior, said pipe being journaled intermediate its ends in a wall of the tank and having its other end extending beyond the tank so that upon up or down movement of the float the pipe ends will be moved in opposite directions, and a counterweight mounted on said last named end of the pipe.

2. In a constant level meter, a tank having a variable source of supply, a float in the tank having an inlet, a cranked discharge pipe, means to turnably connect one end of said pipe to the float and to establish communication between the float interior and said pipe end, said pipe being journaled intermediate its ends in a wall of the tank and having its other end extending beyond the tank, and means associated with the last named end of the pipe to counterbalance the float.

3. In a liquid meter of the character described, a tank connected with a variable source of supply, a hollow float with means to insure its position in rising and falling, gages and a horizontally variable opening to admit liquid to the interior of the float, a crank-shaped discharge pipe having one arm swiveled to the bottom of the float, its main portion turnable in a lubricating joint in the side of the tank, and an exterior, movable weight adjustably carried by said pipe to counterbalance the float and maintain its position in the tank.

4. In combination with a tank having a variable source of supply, a hollow float in the tank having an inlet, an elbow connected to the float bottom and opening thereinto, a sleeve connected to the float bottom and surrounding the horizontal end of the elbow and being spaced therefrom, a horizontal pipe having one end extending into said space between the elbow and sleeve, and a gland secured in the outer end of the sleeve, said pipe having a crank shaped part extending through a side of the tank.

5. In combination with a tank having a variable source of supply, a float having an inlet, and a cranked pipe turnably mounted in a side wall of the tank, said pipe being disposed as an entirety at right angles to the float and having one end turnably connected to the float bottom.

6. In combination with a tank having a variable source of supply, a float in the tank having an inlet, and a cranked discharge pipe connected at one end to the float and supported by the tank and having its other end extending beyond the tank so that upon up or down movement of the float the pipe ends will be moved in opposite directions.

In testimony whereof I have hereunto set my hand in the presence of two subscribing witnesses.

JARROT L. ROLLINS.

Witnesses:
EMILY FOWLER,
W. B. FOWLER.

Copies of this patent may be obtained for five cents each, by addressing the "Commissioner of Patents, Washington, D. C."